United States Patent [19]

Ruhlman

[11] Patent Number: 5,305,505
[45] Date of Patent: Apr. 26, 1994

[54] PROCESS OF MAKING A MULTI-SECTION BOMB CASING

[75] Inventor: James D. Ruhlman, Warren, Pa.

[73] Assignee: National Forge Company, Irvine, Pa.

[21] Appl. No.: 46,433

[22] Filed: Apr. 12, 1993

Related U.S. Application Data

[63] Continuation of Ser. No. 816,840, Dec. 31, 1991, abandoned, which is a continuation of Ser. No. 492,500, Mar. 12, 1990, abandoned.

[51] Int. Cl.$^5$ .............................................. B21K 21/06
[52] U.S. Cl. ........................................ 29/1.2; 29/1.23; 228/114
[58] Field of Search ................ 29/1.2, 1.21, 1.23, 29/463; 228/112, 113, 114; 102/473, 475, 524

[56] References Cited

U.S. PATENT DOCUMENTS

| | | | |
|---|---|---|---|
| 424,442 | 3/1890 | Wood | 29/1.21 X |
| 2,895,418 | 7/1959 | Lyon | 29/1.21 X |
| 3,175,284 | 3/1965 | Cotovski | 228/114 |
| 3,676,907 | 7/1972 | Magis | 29/1.21 |
| 3,762,030 | 10/1973 | Rajala | 228/114 |
| 4,462,312 | 7/1984 | Cahannes | 102/473 X |
| 4,519,117 | 5/1985 | Götz et al. | 29/1.2 |
| 4,774,745 | 10/1988 | Carter | 29/1.2 X |
| 4,977,657 | 12/1990 | Engel et al. | 29/1.21 |
| 5,009,167 | 4/1991 | Sippel et al. | 102/473 X |

FOREIGN PATENT DOCUMENTS

| | | | |
|---|---|---|---|
| 3823014 | of 1963 | Japan | 228/114 |
| 4003617 | of 1974 | Japan | 228/114 |

Primary Examiner—Timothy V. Eley
Attorney, Agent, or Firm—Hale and Dorr

[57] ABSTRACT

A process for making multi-section bomb casings of high strength alloy steel at a reasonable production rate that have the strength and fracture properties of single-piece casings, with the sections being joined using friction welding techniques.

22 Claims, 1 Drawing Sheet

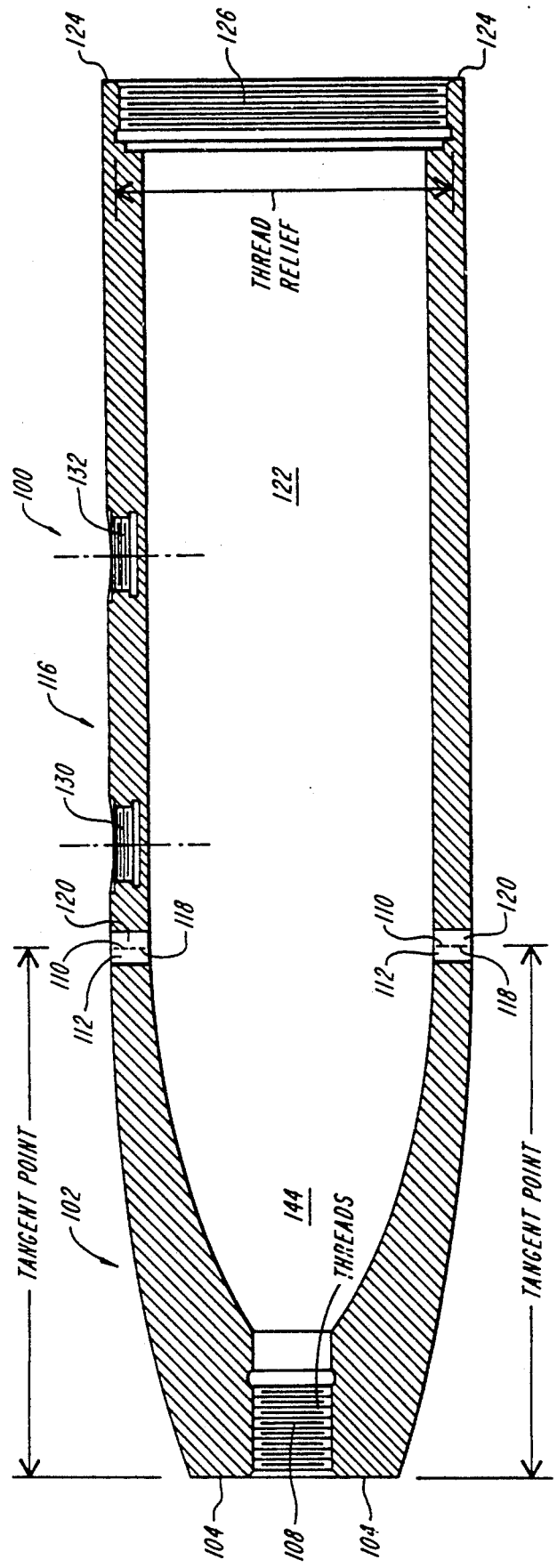

PROCESS OF MAKING A MULTI-SECTION BOMB CASING

This is a continuation of application Ser. No. 07/816,840, filed Dec. 31, 1991, entitled MULTI-SECTION BOMB CASING now abandoned, which is a continuation of application Ser. No. 492,500, filed Mar. 12, 1990 entitled MULTI-SECTION BOMB CASING now abandoned.

TECHNICAL FIELD

The present invention related generally to bomb casings that are used in making bombs. More specifically, the present invention relates to multi-section bomb casings that are used in making bombs effective against hardened targets.

BACKGROUND OF THE INVENTION 500 lb. Mk82 bombs and others of its era are constructed using vintage technology. Such bombs have been in the U.S. weapons inventory for a number of years.

500 lb. Mk82 bomb casings are made from a single-piece, cylindrical tube of low carbon steel that is shaped into the desired cigar-shape. Inserts, such as suspension lugs and access plates, are connected to the casing by filler metal welding techniques. An end member is attached to the open back end of the casing by filler metal welding techniques or by screwing a threaded version of the end member into a threaded open back end on the casing. The casing also may be formed with an integral end member, obviating the need to attach the end member by any of these methods.

500 lb. Mk82 bombs are ineffective against hardened targets such as aircraft shelters, runways, command bunkers, ships, dams, bridges, and armored vehicles. Mk82 bombs upon impacting such targets ricochet off or the casing prematurely breaks up. In either situation, the target is not destroyed. Hence, there was a need for bomb casings of advanced technology that would be part of a bomb effective against hardened targets.

New technology has been developed for constructing bombs with casings made from high strength alloy steel. Heretofore, preferably, these casings have been of single-piece construction. It was necessary to construct the casings in this manner so that they would have the requisite strength and fracture properties. Bombs that incorporated these single-piece casings have been found effective against hardened targets.

The constructive methods for making single-piece casings of high strength alloy steel include forging, casting, or extrusion. One problem with making single-piece casings by these methods is that the equipment for making such casings is in limited supply. Another problem in making single-piece casings is they are expensive.

This new bomb casing technology also has contemplated making multi-section casings. Multi-section casings are less expensive to make than single-piece casings.

A method of making multi-section includes using a two-piece casting or forging of high strength alloy steel. The two pieces are joined by filler metal welding techniques. This method is slow and the welds are susceptible to cracking during heat treatment because of the inability to match exactly the filler and base metals. Hence, casings made by this method, in many cases, do not have the desired strength and fracture properties of single-piece casings.

Multi-section casings also have been made from two-piece forgings in which the sections are joined using electron beam welding techniques. Although acceptable casings have been produced, the method is extremely slow. If the rate of production is increased beyond the normal extremely slow rate, the welds are of inferior quality and susceptible to cracking.

The present invention overcomes these problems and provides a process for making multi-section bomb casings of high strength alloy steel at a reasonable production rate that have the strength and fracture properties of single-piece casings.

SUMMARY OF THE INVENTION

The present invention is a process for making multi-section bomb casings at a reasonable production rate that have the strength and fracture properties of casings of single-piece construction.

The bomb casing of the present invention is formed from two or more high strength alloy-steel sections by using friction welding techniques. One of the sections is an ogive-shaped, front section that serves as the front of the casing. The other sections are cylindrical-shaped and make up the remainder of the casing. The edges of a section that are to be friction welded to an edge of another section is conditioned for this purpose. At the time of edge conditioning, a section has been preliminary heat treated but not heat treated for properties.

After the plurality of sections of a casing are formed and preliminary heat treated, and the appropriate ends are conditioned, the casing is assembled by friction welding the individual sections together. Once the casing is assembled, it is heat treated for properties and then finish machined. After finish machining, the completed casing has the strength and fracture properties similar to those casings of single-piece construction.

An object of the present invention is to provide a process to inexpensively produce at a reasonable production rate, multi-section bomb casings that have the strength and fracture properties similar to single-piece casings.

Another object of the present invention is to provide a process to inexpensively produce at a reasonable rate, multi-section bomb casings that have the strength and fracture properties similar to casings of single-piece construction, with adjacently disposed casing sections being connected by friction welding techniques.

These and other objects will be described in detail in the remainder of the specification and shown in the drawing.

BRIEF DESCRIPTION OF THE DRAWING

The FIGURE shows a cross-sectional view of a multi-section bomb casing made according to the process of the present invention.

DETAILED DESCRIPTION OF THE DRAWING

The present invention is a process for making multi-section bomb casings at a reasonable production rate that have the strength and fracture properties of casings of single-piece construction. This process is inexpensive compared to the cost of making single-piece casings.

Referring to the FIGURE, a cross-sectional view of a multi-section bomb casing made according to the process of the present invention is shown generally at 100. The casing comprises two sections, ogive-shaped, front section 102 and cylindrical-shaped, rear section 116. The sections are made of a high strength alloy steel, such as AISI 4140 and 4340 (modified) grades of steel.

Preferably, ogive-shaped, front section 102 may be formed by either close-die forging or static casting. The wall thickness of this section progressively increases from rear edge 110 to forward end 104.

Threaded bore 108 is disposed in front end 104 and extends through the front end wall thickness to central opening 114 in ogive-shaped, front section 102. Threaded bore 108 receives a threaded bomb nose plug (not shown) in a screw-nut relationship.

After ogive-shaped, front section 102 is formed, it is preliminary heat treated by annealing. Once annealing is complete, rear edge 110 at 112 is conditioned in a conventional manner for friction welding.

Preferably, cylindrical-shaped, rear section 116 may be formed by extruding or centrifugal casting high strength alloy steel. The wall thickness of the cylindrical-shaped, rear section is uniform throughout its length, except at rear end 124. This wall thickness of the cylindrical-shape, rear section is substantially the same as the wall thickness of ogive-shaped, front section 102 at rear edge 110. The cylindrical-shaped, rear section has central opening 122.

Once the cylindrical-shaped rear section is formed, it is preliminary heat treated by annealing. After annealing, front edge 118 at 120 is conditioned in a conventional manner for friction welding.

The finished cylindrical section has a threaded end opening 126 at rear end 124. Threaded end opening 126 receives an aft closure structure (not shown) in a screw-nut relationship. A fin assembly (not shown) attaches to the aft closure structure.

The finished section also has threaded bores 130 and 132. Each of the threaded bores receives the threaded base of a suspension lug (not shown). The suspension lugs are used for lifting the completed bombs and attaching them to aircraft wing bomb mounts.

Once ogive-shaped, front section 102 and cylindrical-shape, rear section 116 are formed, annealed, and conditioned for friction welding, the two sections are friction welded together. Friction welding is accomplished by rotating one of the sections at a predetermined rate and bringing the appropriate edge of the other section in contact with it. The edges to the two sections heat to their melting point, at which time, the edges become fused. The resulting friction weld contains no filler metal or weld gaps. Further, the metal and metal properties of the casing along its entire length, even across the friction weld, are homogeneous. This, therefore, results in a bomb casing having strength and fracture properties that are substantially the same as those for casings of single-piece construction.

Following friction welding, the casing is heat treated for properties and finish machined. Heat treating for properties includes liquid quenching plus tempering.

After machining, the casing is processed for painting. It is painted, then assembled with a nose plug, fusing assembly, and aft closure, and shipped to the loading plant. At the loading plant, the casing, nose plug, and aft closure are painted with the final coats. Explosive loading also is performed at the plant.

After these operations are completed, a fin assembly and suspension lugs are attached to the bomb assembly. The completed bomb is loaded onto a pallet and placed into inventory. It is now ready for use against hardened targets.

The friction welding techniques allow for multi-section bomb casings having the strength and fracture properties of casings of single-piece construction to be produced at a reasonable production rate which was not possible by prior art methods of producing the multi-section bomb casings.

The terms and expressions which are used herein are used as terms of expression and not of limitation. And, there is no intention, in the use of such terms and expressions, of excluding the equivalents of the features shown and described, or portions thereof, it being recognized that various modifications are possible in the scope of the invention.

I claim:

1. A process for making bomb casings having a plurality of sections at a predetermined production rate, with the resulting bomb casing having the plurality of sections joined together such that the casing has substantially uniform metal properties along its length and across each location where two sections are joined, comprising the steps of:
   (a) forming a substantially hollow section by a casting method;
   (b) preliminarily heat treating the section formed at step (a);
   (c) preparing for welding predetermined edges of the section preliminarily heat treated at step (b);
   (d) repeating steps (a), (b), and (c) for each of the plurality of sections of the casing;
   (e) assembling the casing from the plurality of sections formed by steps (a), (b), (c), and (d) by welding together adjacently disposed sections of the casings at the edges prepared for welding; and
   (f) heat treating for properties the casing assembled at step (e).

2. The process as recited in claim 1, wherein step (a) or (d) includes forming an ogive-shaped, front section for the casing.

3. The process as recited in claim 2, wherein step (a) or (d) includes forming the ogive-shaped, front section for the casing by a close-die forging method.

4. The process as recited in claim 2, wherein step (a) or (d) includes forming the ogive-shaped, front section for the casing by a static casting method.

5. The process as recited in claim 1, wherein step (a) or (d) includes forming at least one cylindrical-shaped section for the casing.

6. The process as recited in claim 5, wherein step (a) or (d) includes forming at least one cylindrical-shaped section for the casing by a centrifugal casting method.

7. The process as recited in claim 5, wherein step (a) or (d) includes forming at least one cylindrical-shaped section for the casing by an extrusion method.

8. The process as recited in claim 1, wherein step (b) includes preliminary heat treating by annealing.

9. The process as recited in claim 1, wherein step (f) includes heat treating for properties by liquid quenching plus tempering.

10. The process as recited in claim 1, wherein the process further comprises the step of finish machining the casing assembled at step (f).

11. The process of claim 1, wherein the substantially hollow section is formed by a forging method.

12. The process of claim 1, wherein the substantially hollow section is formed by an extrusion method.

13. A process for making bomb casings having a plurality of sections at a predetermined production rate, with the resulting bomb casing having the plurality of sections joined together such that the casing has substantially uniform metal properties along its length and across each location where two sections are joined, comprising the steps of:

(a) forming a substantially hollow, ogive-shaped, front section by a casting method;
(b) preliminarily heat treating the section formed at step (a);
(c) forming at least one substantially hollow, cylindrical-shaped section by a casting method;
(d) preliminarily heat treating the section formed at step (c);
(e) preparing for welding predetermined edges of the sections preliminarily heat treated at step (b) and (d);
(f) assembling the casing from the plurality of sections formed by steps (a), (b), (c), (d), and (e) by welding together adjacently disposed sections of the casing at the edges prepared for welding; and
(g) heat treating for properties the casing assembled at step (f).

14. The process as recited in claim 13, wherein step (a) includes forming the ogive-shaped, front section of the casing by a close-die forging method.

15. The process as recited in claim 13, wherein step (a) includes forming the ogive-shaped, front section of the casing by a static casting method.

16. The process as recited in claim 13, wherein step (c) includes forming at least one cylindrical-shaped section of the casing by a centrifugal casting method.

17. The process as recited in claim 13, wherein step (c) includes forming at least one cylindrical-shaped section of the casing by an extrusion method.

18. The process as recited in claim 13, wherein steps (b) and (d) include preliminary heat treating by annealing.

19. The process as recited in claim 13, wherein step (g) includes heat treating for properties by liquid quenching plus tempering.

20. The process as recited in claim 13, wherein the process further comprises the step of finish machining the casing assembled at step (g).

21. The process of claim 13, wherein the front section and cylindrical-shaped section are formed by a forging method.

22. The process of claim 13, wherein the front section and cylindrical-shaped section are formed by an extrusion method.

* * * * *